(12) United States Patent
Jeganathan et al.

(10) Patent No.: US 7,662,308 B2
(45) Date of Patent: Feb. 16, 2010

(54) POLYHEDRAL OLIGOMERIC SILSESQUIOXANE (POSS) BASED FLUORESCENT COLORANTS

(75) Inventors: Suruliappa G. Jeganathan, Chadds Ford, PA (US); David Bramer, Putnam Valley, NY (US); Redina Kote, Peekskill, NY (US); Gajanan J. Maladkar, Mumbai (IN)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 349 days.

(21) Appl. No.: 11/879,146

(22) Filed: Jul. 16, 2007

(65) Prior Publication Data

US 2008/0029739 A1 Feb. 7, 2008

Related U.S. Application Data

(60) Provisional application No. 60/836,025, filed on Aug. 7, 2006.

(51) Int. Cl.
*C09K 11/06* (2006.01)

(52) U.S. Cl. .................. 252/301.16; 106/493; 106/497; 106/498; 106/31.64; 106/31.75; 106/31.77; 106/31.78; 106/31.8; 556/409; 556/450; 556/460; 524/88; 524/89; 524/90; 524/94; 524/104; 524/262; 524/267; 524/268; 528/34; 528/41; 528/42

(58) Field of Classification Search ............ 252/301.16, 252/301.34, 301.35; 556/409, 450, 460; 528/34, 41, 42; 524/88–90, 94, 104, 262, 524/267, 268; 106/493, 497, 498, 31.64, 106/31.75, 31.77, 31.78, 31.8
See application file for complete search history.

(56) References Cited

U.S. PATENT DOCUMENTS

| 5,863,459 | A | 1/1999 | Merchak et al. ......... 252/301.16 |
| 5,874,580 | A | 2/1999 | Hao et al. ..................... 540/37 |
| 5,904,878 | A | 5/1999 | Merchak et al. ......... 252/301.16 |
| 6,923,856 | B2 | 8/2005 | Fraser et al. ................. 106/496 |
| 6,946,550 | B2 | 9/2005 | Fraser et al. ................. 534/760 |
| 2003/0120099 | A1 | 6/2003 | Laine et al. ................. 556/450 |
| 2004/0204521 | A1 | 10/2004 | Camenzind et al. ........... 524/90 |
| 2005/0123760 | A1 | 6/2005 | Cammach et al. ........... 428/403 |
| 2005/0269556 | A1 * | 12/2005 | Evans et al. ................. 252/586 |

FOREIGN PATENT DOCUMENTS

| WO | WO 2005/037955 | * | 4/2005 |
| WO | WO 2007/147742 | * | 12/2007 |

* cited by examiner

*Primary Examiner*—C. Melissa Koslow
(74) *Attorney, Agent, or Firm*—Joseph Suhadolnik

(57) ABSTRACT

Novel fluorescent polyhedral oligomeric silsesquioxane (POSS) colorants are provided. The colorants are strongly fluorescing and long lasting with excellent light stability. The novel colorants can be prepared from chromophores found in common pigments and provide a simple way to convert an insoluble pigment into a soluble fluorescent colorant.

15 Claims, No Drawings

US 7,662,308 B2

POLYHEDRAL OLIGOMERIC SILSESQUIOXANE (POSS) BASED FLUORESCENT COLORANTS

This application claims benefit under 35 USC 119(e) of U.S. provisional application No. 60/836,025 filed Aug. 7, 2006 which application is incorporated herein by reference.

The present invention provides novel fluorescent polyhedral oligomeric silsesquioxane (POSS) colorants. The colorants are strongly fluorescing and long lasting and are useful in a wide variety of applications including printing inks, coatings and the coloration of plastics. Biomedical uses include medical imaging and fluorescent marking. The novel colorants can be prepared from chromophores found in common pigments and provide a simple way to convert an insoluble pigment into a soluble fluorescent colorant.

Pigments are differentiated from dyes by their physical characteristics rather than by chemical composition. Dyes, unlike pigments, dissolve during their application and in the process lose their crystal or particulate structure.

Fluorescent colorants, which generally are based on organic dyes, represent an important class of materials commonly used in coloring printing inks, paints and plastics. Colorants often referred to as industrial fluorescent pigments are obtained by dissolving a fluorescent dye in a suitable media, such as a resin matrix. The resin matrix is then broken to a specific size, typically of several microns, so that it may be used as a pigment.

In general, organic pigments exhibit no fluorescence or fluorescence very low intensity. Only a limited number of fluorescent organic pigments are described in the art, as, for example, fluorescent C.I. Pigment Yellow 101 described in W. Herbst and K. Hunger, Industrial Organic Pigments, 2.sup.nd Ed., VCH Verlagsgesellschaft, Weinheim, 1997, 571-572.

Compared to dyes, pigments have several advantages, such as good lightfastness properties or weather resistance and freedom from transfer problems.

It is desirable to impart fluorescence to organic pigments to obtain fluorescent organic colorants with the advantageous properties of pigments and provide an alternative to the fluorescent dyes mentioned above. A particularly interesting commercial application for such colorants is found in security marking of objects, including security printing applications.

U.S. Pat. Nos. 5,863,459 and 5,904,878, incorporated herein in their entirety by reference, disclose a method of enhancing the fluorescence of yellow and orange diarylide pigments by adding an isolated, dry pigment powder to an organic solvent or water and subjecting the resulting a slurry to a heat treatment under elevated pressure for several hours.

U.S. Pat. No. 5,874,580, incorporated herein in its entirety by reference, discloses carbamate group-containing soluble chromophores of the quinacridone, anthraquinone, perylene, indigo, quinophthalone, isoindolinone, isoindoline, dioxazine, phthalocyanine or azo series which exhibit strong solid state fluorescence.

U.S. Pat. No. 6,946,550, incorporated herein in its entirety by reference, discloses yellow and red azo compounds, and their use as fluorescent compounds, in particular as solid fluorescent compounds, such as for special effect printing, security printing or in the opto-electronic field.

U.S. Pat. No. 6,923,856, incorporated herein in its entirety by reference, discloses a process for the preparation of organic pigments with enhanced fluorescence by treating said pigments with a surfactant.

Despite the above, a need still exists for durable fluorescent organic colorants which can be readily obtained by a straightforward process and which colorants show fluorescence of high intensity.

US Published Pat. Appl. 20040204521, October 2004, incorporated herein in its entirety by reference, discloses the preparation of additive functionalized organophilic nanoscaled fillers.

EP 0504541.7 discloses functionalized nanoparticles, for example silicon and aluminum oxide nanoparticles, to which dyes are bound and to the use thereof as coloring materials for organic materials. The nanoparticle dyes have many desirable characteristics including increased fluorescence, however, the functionalized nanoparticles are not soluble in many common materials.

US Published Pat. Appl. 20050123760, Jun. 9, 2005, incorporated herein in its entirety by reference, discloses a light-emitting nanoparticle prepared by covalently attaching a lumophore, i.e a chromophore that emits light when exposed to electromagnetic radiation, to a silsequioxane nanoparticle core. "Silsequioxane" is the general name for a family of polycyclic compounds consisting of silicon and oxygen also known as silasesquioxanes and polyhedral oligomeric silsesquioxanes. One particular embodiment of US Pat. Appl. 20050123760 is a nanoparticle to which various colored lumophores are attached which is therefore capable of emitting white light.

The lumophores attached to the silsequioxanes of US Pat. Appl. 20050123760 include certain known fluorescent dyes and the resulting light-emitting nanoparticles are susceptible to the drawbacks of such dyes, e.g., they are not stable under many conditions of use and lose their color and fluorescence due to chemical degradation initiated by environmental factors such as exposure to heat and light.

The present invention discloses highly fluorescent colorants with improved properties such as excellent light stability and solubility or excellent dispersibility in a number of polymer systems.

In the present disclosure:

A nanoparticle is a particle having a cross-sectional measurement (e.g., diameter if spherical) of about 100 nm or less. The silsequioxane group of the formula (I) is an example of a nanoparticle.

A "chromophore" is a molecule or aggregate of molecules that can absorb electromagnetic radiation.

"Silsequioxane" is the general name for a family of polycyclic compounds consisting of silicon and oxygen. Silsequioxanes are also known as silasesquioxanes and polyhedral oligomeric silsesquioxanes and are abbreviated "POSS".

DESCRIPTION OF THE INVENTION

The present invention provides novel fluorescent colorants of formula (I)

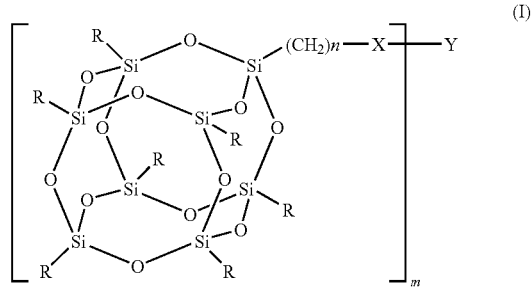

wherein, m is 1 or 2;

n is 1-18, for example n is 1, 2, 3 or 4, for example n is 3;

X is a direct bond, —O—, —S—, —NH—, —CO—, or —COO—; for example X is a direct bond, —NH—, or —CO—, for example a direct bond;

each R is independently selected from the group consisting of C$_1$-C$_{25}$ alkyl, C$_2$-C$_{25}$ alkyl interrupted one or more times by one or more groups selected from —O— and —S—, C$_2$-C$_{24}$ alkenyl, C$_3$-C$_{24}$ alkenyl interrupted one or more times by one or more groups selected from —O— and —S—, C$_7$-C$_9$ phenylalkyl, a group —(CH$_2$)n-X—(Y)z wherein n is defined as above and z is 1 or ½ and when more than one z is present each z is independently selected, phenyl and phenyl substituted 1 to 5 times by one or more groups selected from C$_1$-C$_8$alkyl, C$_1$-C$_8$alkyloxy and halogen; for example, R is C$_1$-C$_6$alkyl, typically isobutyl or cyclohexyl or is a group —(CH$_2$)n-X—(Y)z; and Y is a radical of a chromophore selected from the group consisting of azo dyes, benzoxanthenes such as benzoxanthenes, benzoxanthenes and benzoxanthenes, naphthalimides, diketopyrrolopyrroles, perylenes, quinacridones, xanthenes, diphenylmaleimides, acetoacetamides, perylenemonoimides and phthalimides, wherein when more than one Y is present, each Y is selected independently of the others.

For example, Y is a radical of a chromophore selected from the group consisting of perylene, benzoxanthene, naphthalimide, quinacridone, diketopyrrolopyrrole and phthalocyanine chromophores; for example, Y is a perylene, benzoxanthene, naphthalimide or diketopyrrolopyrrole chromophore.

In one particular embodiment of the invention Y is derived from a chromophore which is part of a pigment, or typically found as part of a pigment particle. Thus, an easily handled, fluorescent colorant soluble in a variety of polymers, inks and other vehicles is readily derived from an insoluble solid. In such an embodiment Y is derived, for example from a xanthene, perylene, benzoxanthene, naphthalimide, diketopyrrolopyrrole, quinacridone or phthalocyanine pigment, and in a particular embodiment, Y is derived from a perylene, benzoxanthene, naphthalimide or diketopyrrolopyrrole pigment.

Particularly useful radicals for Y are those of formula

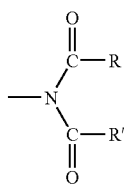

(2)

wherein R and R' together with the residue of formula —N(CO—)$_2$ form the radical of a perylene, benzoxanthene or naphthalimide dye.

Examples of such radicals of formula (2) include the following:

Radicals derived from naphthalimide and diphenylmaleimide dyes:

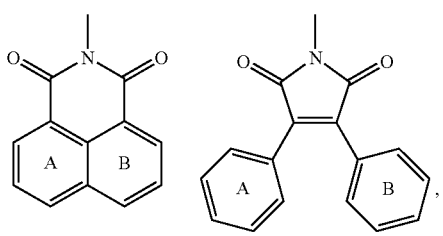

(4)

wherein the rings A and B can be unsubstituted or substituted by C$_{1-8}$alkyl, C$_{1-8}$alkoxy, amino, mono- or di(C$_{1-8}$alkyl)amino, halogen or sulfo.

Radicals derived from benzoxanthene dyes:

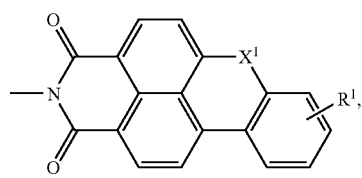

(5)

wherein
R$^1$ is C$_{1-8}$alkyl, C$_{1-8}$alkoxy, C$_{1-8}$thioalkyl, amino, mono- or di(C$_{1-8}$alkyl)amino, or halogen, and X is —O—, —S—, —NH—, or —N(R$^2$)—, wherein R$^2$ is C$_{1-8}$alkyl, hydroxy-C$_{1-8}$alkyl, or C$_{6-10}$aryl.

Radicals derived from perylene dyes

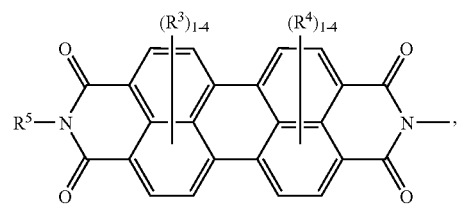

(6)

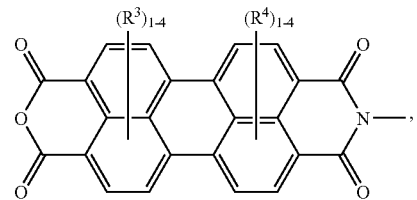

(7)

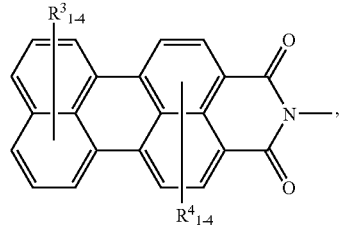

(8)

wherein
R$^3$ and R$^4$, independently of each other, are hydrogen; C$_1$-C$_8$alkyl; phenyl or naphthyl which can be substituted by C$_1$-C$_8$alkyl, C$_1$-C$_8$alkoxy or halogen; cyano; nitro; halogen; —OR$^6$; —COR$^6$; —COOR$^6$; —OCOR$^6$; —CONR$^6$R$^7$; —OCONR$^6$R$^7$; —NR$^6$R$^7$; —NR$^6$COR$^7$; —NR$^6$COOR$^7$; —NR$^6$SO$_2$R$^6$; —SO$_2$R$^6$; —SO$_3$R$^7$; —SO$_2$NR$^6$R$^7$ or —N=N—R$^6$; and R$^6$ and R$^7$ are each independently of the others hydrogen; C$_1$-C$_8$alkyl; or phenyl which can in turn be further substituted by C$_1$-C$_8$alkyl, C$_1$-C$_8$alkoxy or halogen;

R$^5$ is hydrogen; C$_1$-C$_{25}$alkyl, which can be substituted by halogen, phenyl or naphthyl, whereby the phenyl or naphthyl can in turn be further substituted by C$_1$-C$_8$alkyl or C$_1$-C$_8$alkoxy; allyl which can be substituted one to three times with $C_1$-$C_4$alkyl; a $C_5$-$C_7$cycloalkyl group; a $C_5$-$C_7$cycloalkyl group, which can be condensed one or two times by phenyl which can be substituted one to three times with $C_1$-$C_4$-alkyl, halogen, nitro or cyano; a $C_2$-$C_{25}$alkenyl group which can be substituted by halogen; or a $C_2$-$C_{25}$alkynyl group which can be substituted by halogen, for example, $R^5$ is $C_1$-$C_{25}$alkyl, which can be substituted by halogen, phenyl or naphthyl, whereby the phenyl or naphthyl can in turn be further substituted by $C_1$-$C_8$alkyl or $C_1$-$C_8$alkoxy, for example $R^5$ is $C_1$-$C_{25}$alkyl;

$R^3$ and $R^4$ are preferably, independently of each other, hydrogen; $C_1$-$C_8$alkyl; phenyl or naphthyl which can be substituted by $C_1$-$C_8$alkyl, $C_1$-$C_8$alkoxy or halogen; cyano; nitro; halogen; amino; hydroxyl; or —COOR$^6$, wherein R$^6$ is as defined above; for example $R^3$ and $R^4$ are hydrogen or —COOR$^6$.

Other examples of radicals useful as Y include the following:

(9)

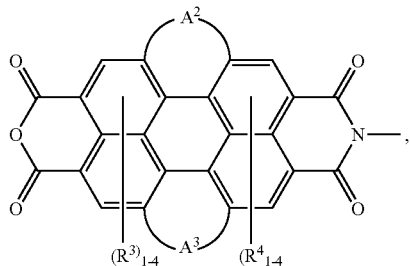

(10)

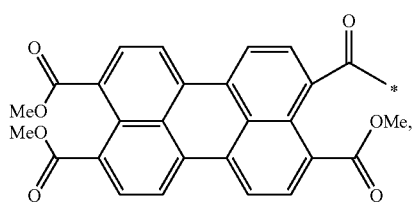

(11)

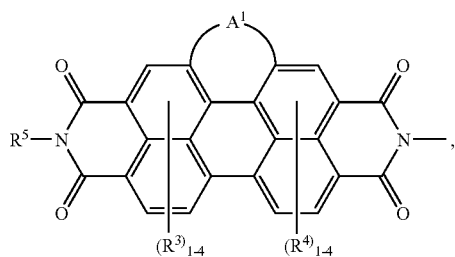

(12)

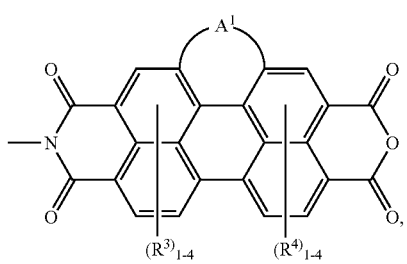

(13)

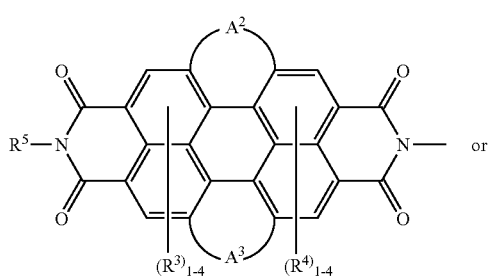

wherein
R$^3$, R$^4$ and R$^5$ are as defined above, and
A$^1$ and A$^3$ are each independently of the other —S—, —S—S—, —CH=CH—, R$^8$OOC—C(—)=C(—)—COOR$^8$, —N=N— or —N(R$^9$)—, or a linkage selected from the group consisting of the organic radicals of formulae

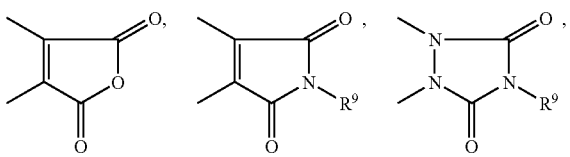

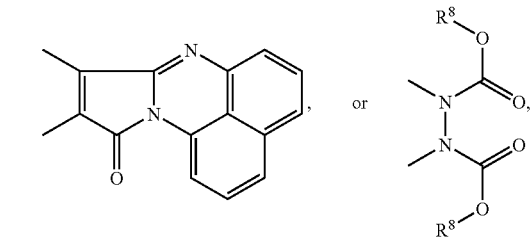

wherein
R$^{107}$ is hydrogen, $C_1$-$C_{24}$alkyl or $C_1$-$C_{24}$cycloalkyl,
R$^{108}$ is unsubstituted or substituted $C_1$-$C_{24}$alkyl, $C_1$-$C_{24}$cycloalkyl, phenyl, benzyl, —CO—$C_1$-$C_4$alkyl, —CO—$C_6$H$_5$ or $C_1$-$C_4$alkylcarboxylic acid ($C_1$-$C_4$alkyl) ester, and A$^2$ is a linkage of formula

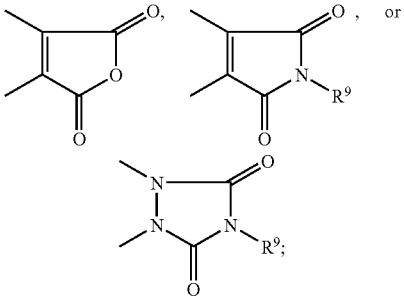

Radicals derived from diketopyrrolopyrroles of formula:

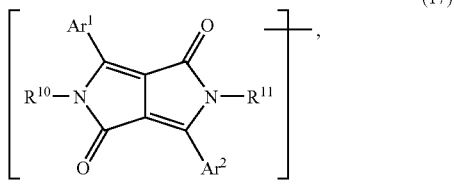

(17)

wherein $R^{10}$ and $R^{11}$ are independently of each other an organic group, and
$Ar^1$ and $Ar^2$ are independently of each other an aryl group or a heteroaryl group, which can optionally be substituted.

The term "aryl group" in the definition of $Ar^1$ and $Ar^2$ is typically $C_6$-$C_{30}$aryl, such as phenyl, indenyl, azulenyl, naphthyl, biphenyl, terphenylyl or quadphenylyl, as-indacenyl, s-indacenyl, acenaphthylenyl, phenanthryl, fluoranthenyl, triphenylenyl, chrysenyl, naphthacen, picenyl, perylenyl, pentaphenyl, hexacenyl, pyrenyl, or anthracenyl, preferably phenyl, 1-naphthyl, 2-naphthyl, 9-phenanthryl, 2- or 9-fluorenyl, 3- or 4-biphenyl, which may be unsubstituted or substituted.

The term "heteroaryl group", especially $C_2$-$C_{30}$heteroaryl, is a ring, wherein nitrogen, oxygen or sulfur are the possible hetero atoms, and is typically an unsaturated heterocyclic radical with five to 18 atoms having at least six conjugated $\pi$-electrons such as thienyl, benzo[b]thienyl, dibenzo[b,d]thienyl, thianthrenyl, furyl, furfuryl, 2H-pyranyl, benzofuranyl, isobenzofuranyl, 2H-chromenyl, xanthenyl, dibenzofuranyl, phenoxythienyl, pyrrolyl, imidazolyl, pyrazolyl, pyridyl, bipyridyl, triazinyl, pyrimidinyl, pyrazinyl, 1H-pyrrolizinyl, isoindolyl, pyridazinyl, indolizinyl, isoindolyl, indolyl, 3H-indolyl, phthalazinyl, naphthyridinyl, quinoxalinyl, quinazolinyl, cinnolinyl, indazolyl, purinyl, quinolizinyl, chinolyl, isochinolyl, phthalazinyl, naphthyridinyl, chinoxalinyl, chinazolinyl, cinnolinyl, pteridinyl, carbazolyl, 4aH-carbazolyl, carbolinyl, benzotriazolyl, benzoxazolyl, phenanthridinyl, acridinyl, perimidinyl, phenanthrolinyl, phenazinyl, isothiazolyl, phenothiazinyl, isoxazolyl, furazanyl or phenoxazinyl, preferably the above-mentioned mono- or bicyclic heterocyclic radicals, which may be unsubstituted or substituted.

Typically $Ar^1$ and $Ar^2$ are phenyl; naphthyl, like 1- or 2-naphthyl; biphenyl, like 3- or 4-biphenyl; phenanthryl, like 9-phenanthryl; or flurorenyl, like 2- or 9-fluorenyl, for example $Ar^1$ and $Ar^2$ are phenyl or naphthyl, typically phenyl. $Ar^1$ and Ar2 can be unsubstituted or substituted by, for example, $C_1$-$C_{12}$alkyl; $C_1$-$C_{12}$alkoxy; halogen, like fluorine, chlorine or bromine; cyano; amino; N-mono- or N,N-di-($C_1$-$C_{12}$alkyl)amino; phenylamino, N,N-di-phenylamino, naphthylamino or N,N-di-naphthylamino, wherein the phenyl or naphthyl radicals can be further substituted by, for example, $C_1$-$C_{12}$alkyl, $C_1$-$C_{12}$alkoxy or halogen. Typical substituents are $C_1$-$C_{12}$alkyl, for example, $C_1$-$C_4$alkyl; $C_1$-$C_{12}$alkoxy, for example, $C_1$-$C_4$alkyl; and halogen.

$R^{10}$ and $R^{11}$ may be the same or different and are, for example, selected from a $C_1$-$C_{25}$alkyl group, which can be substituted by fluorine, chlorine, bromine or hydroxyl, an allyl group, which can be substituted by $C_1$-$C_4$alkyl, a cycloalkyl group, a cycloalkyl group, which can be condensed one or two times by phenyl which can be substituted by $C_1$-$C_4$-alkyl, halogen, nitro or cyano, an alkenyl group, a cycloalkenyl group, an alkynyl group, a haloalkyl group, a haloalkenyl group, a haloalkynyl group, a ketone or aldehyde group, an ester group, a carbamoyl group, a ketone group, a silyl group, a siloxanyl group, $R^{10}$ and $R^{11}$ are typically $C_1$-$C_{25}$alkyl, which is unsubstituted or substituted by fluorine, chlorine, bromine or hydroxyl;

Typically $R^{117}$ and $R^{118}$ are $C_1$-$C_{25}$alkyl; or benzyl, which is unsubstituted or substituted in the phenyl ring by $C_1$-$C_8$alkyl, $C_1$-$C_8$alkoxy or halogen.

When Y is derived from an azo dye, such dyes include the following:

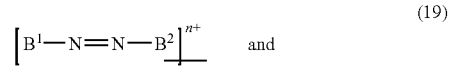

(19)

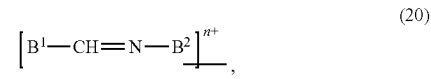

(20)

wherein
$B^1$ and $B^2$, independently of each other, are phenyl, naphthyl, or a heterocylic group, each of which can be substituted by $C_1$-$C_8$alkyl, $C_1$-$C_8$alkoxy, phenyl, halogen, or a radical of formula —N($R^{13}$)$R^{14}$, —N($R^{13}$)($R^{14}$)$R^{15}$ or —O$R^{13}$, wherein $R^{13}$, $R^{14}$ and $R^{15}$ are hydrogen, $C_1$-$C_8$alkyl, $C_1$-$C_8$hydroxyalkyl or phenyl, which phenyl radical can be further substituted by one of the substituents given above for $B^1$ and $B^2$, Typical heterocyclic groups are the imidazole and the pyridazine group.

When more than one Y group is present, each of the Y groups can be derived from a different class of chromophore or be derived from the same general class of chromophore by bear different substituent groups. Typically, when more than one Y is present, all Y groups are the same or derived from the same chromophore class.

In the compounds according to formula (I), any number of R groups can be a group —(CH$_2$)n-X—(Y)z wherein n is defined as above and z is 1 or ½ and when more than one z is present each z is independently selected. For Example, the number of R groups equal to —(CH$_2$)n-X—(Y)z can be any number from 0 through 7. That is, none of the R may be equal to —(CH$_2$)n-X—(Y)z, or any number of R groups from 1 through 7 may be equal to —(CH$_2$)n-X—(Y)z. In general, the number of R groups equal to —(CH$_2$)n-X—(Y)z is either 0, 1, 2 or 3, typically 0 or 1.

When one or more R groups are —(CH$_2$)n-X—(Y)z wherein z is ½, the possibility arises for comounds of formula I wherein a series of POSS groups are linked through groups —(CH$_2$)n-X—(Y)—X—(CH$_2$)n-, in particular, when m is 2. In this instance all groups X, as defined above, need not be the same. Such a compound containing a series of POSS groups may be linear or branched depending on the number of groups R equal to —(CH$_2$)n-X—(Y)z.

In contrast to the dye bearing nanoparticles of EP 0504541.7 wherein colorants are covalently bound to colloidal silica, the present invention binds the colorant to a silsesquioxane core of defined structure. The silsesquioxane core also bears organic substituents, such as alkyl chains etc., and the silsesquioxane colorant of the present invention is soluble in many organic solvents and substrates.

The present invention also encompasses compounds wherein a small amount of the silsesquioxane, for example less than 10% of the silsesquioxane groups present, comprises additional silane or siloxy groups which are the result of the preparation of the silsesquioxane core. For example, the R groups of formula (I) may comprise silane or siloxy groups or chains of said groups resulting from side reactions in the preparation of silsesquioxane. It is anticipated that an even smaller amount of the silsesquioxane groups will contain R groups such that dimeric or oligomeric silsesquioxane groups will be formed. In general, the products derived from these minor components will not have a significant effect on the effectiveness of the fluorescent colorants of this invention.

The fluorescent colorants of the present invention are prepared via known reactions involving the appropriately functionalized silsesquioxane and chromophore derivative. For example, known methods of preparing ether, ester, amide, imide, urea, thioether or thioester linkages can be readily employed to couple the desired silsesquioxane and chromophore. For example:

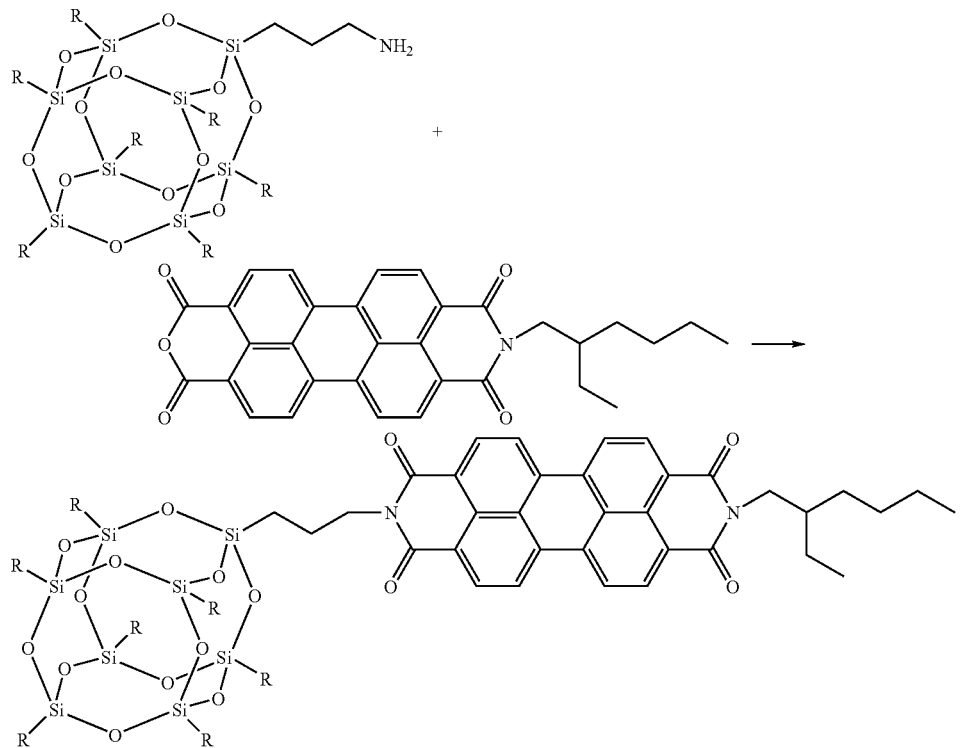

Other useful bond forming reactions are described, for example, in US Published Pat Appl. 2005/0123760, the references therein and in EP0504541.7, however the exact nature of preparation is not a critical feature of the invention and is therefore not limited to the Examples herein.

The fluorescent colorants of the present invention can be used in any application wherein pigments and dyes are encountered and are of course valuable in applications where the fluorescence of the colorant provides a useful function as in security marking or bio assays, or imparts a particularly desried color or effect.

The colorants are employed in general by methods known per se, for example (a) for mass coloring polymers; (b) for the preparation of paints, paint systems, coating compositions, paper colors, printing colors, inks including ink-jet applications and writing purposes, as well as in electrophotography, e.g. for dry copier systems and laser printers; (c) for security marking purposes, such as for checks, check cards, currency notes, coupons, documents, identity papers and the like, where a special unmistakable color impression is to be achieved; (d) as an additive to colorants, such as pigments and dyes, where a specific color shade is to be achieved, in particular where luminous shades are desired; (e) for marking objects for machine recognition of these objects via the fluorescence, for example for machine recognition of objects for sorting, examples including the recycling of plastics, alpha-numerical prints or barcodes; (f) for the production of passive display elements for a multitude of display, notice and marking purposes, e.g. passive display elements, notices and traffic signs, such as traffic lights, safety equipment; (g) for marking with fluorescence in the solid state; (h) for decorative and artistic purposes; (i) for modifying inorganic substrates such as aluminum oxide, silicon dioxide, titanium dioxide, tin oxide, magnesium oxide (including "stone wood"), silicates, clay minerals, calcium-, gypsum- or cement-containing surfaces, for example coatings or plaster surfaces; (j) in optical light collection systems, in fluorescence solar collectors (see Nachr. Chem. Tech. Lab. 1980, 28, 716), in fluorescence-activated displays (see Elektronik 1977, 26, 6), in cold light sources used for light-induced polymerization for the preparation of plastics, for testing of materials, for example in the production of semiconductor circuits, for analyzing microstructures of integrated semiconductor components, in photoconductors, in photographic processes, in display, illumination or image converter systems, where excitation is effected by electrons, ions or UV radiation, e.g. in fluorescent displays, Braun tubes or in fluorescent lamps, as part of an integrated semiconductor circuit containing dyes as such or in combination with other semiconductors, for example in the form of an epitaxy, in chemiluminescence systems, e.g. in chemiluminescent flashlights, in luminescence immunoassays or other luminescence detection processes, as signal paints, for marking signs and other objects for which a particular visual color impression is to be achieved, in dye lasers, preferably as fluorescent dyes for generating laser beams, as optical recording medium and also as Q-switches; (k) for converting the frequency of light, e.g. for turning short-wave light into long-wave visible light or for doubling or tripling the frequency of laser light in non-linear optics; (l) for tracer purposes, e.g. in biochemistry, medicine, technology and natural science, where the novel colorants can be linked covalently to the substrates or via secondary valences, such as hydrogen bonds or hydrophobic interactions (adsorption); and (m) in highly sensitive detection processes (see Z. Analyt. Chem. 1985, 320, 361), in particular as fluorescent colourants in scintillators.

For example, the compounds of the present invention are used as high fluorescent colorants for coatings, plastics and inks application, especially in plastics and security printing inks. Other uses are in the biomedical area, particularly medical imaging.

The fluorescent colorants of the present invention are either soluble or readily and evenly dispersed in a wide variety of solvents and polymers providing evenly colored systems which retain their color under aging or weathering conditions longer than commonly encountered dyes. The fluorescence of these colored systems is much higher than systems colored by known pigments comprising similar chromophores and this fluorescence is likewise retained under aging or weathering conditions longer than commonly encountered fluorescent dyes.

The use of the fluorescent colorants of the present invention is not limited by the manner in which they are incorporated into the final application.

In any composition comprising the present fluorescent colorants, one would naturally expect to find other commonly encountered components including stabilizers, for example antioxidants, UV absorbers, hindered amine or other light stabilizers, phosphites or phosphonites, benzofuran-2-ones, thiosynergists, polyamide stabilizers, metal stearates; also other fluorescent materials, processing aids, solvents etc., nucleating agents, fillers, reinforcing agents, lubricants, emulsifiers, dyes, pigments, dispersents, optical brighteners, flame retardants, antistatic agents, blowing agents and the like.

The amount of the fluorescent colorants of the present invention used in an application will vary greatly depending on the end use and effect desired. Typical load levels are well know to the practitioner or are readily found in the literature and would be adequate starting points for those formulating with the present fluorescent colorants.

The fluorescent colorants of the present invention can therefore be used in almost any concentration depending on the end use application.

While almost any amount of the novel compounds of formula I can be incorporated into a high molecular weight organic material, typically the novel fluorescent colorants are used in an amount of 0.01 to 30% by weight, for example 0.1 to 10% by weight, based on the high molecular weight organic material to be pigmented.

For example, fluorescent colorants of the present invention are used to color high molecular weight organic compounds which may be in the form plastic materials, melts or of spinning solutions, paint systems, coating materials or printing inks, for example, a coating composition comprising an organic film-forming binder and a fluorescent colorant of the present invention. Depending on the end use requirement, it may be expedient to use the novel compounds of formula I as toners or in the form of preparations.

The novel compounds of formula I are particularly suitable for the mass coloration of thermoplastic, thermoset and elastomeric polymers which may also be crosslinked. These polymers may be in the form of, for example, molded articles, extruded workpieces, films, sheets, etc, as well as part of paint systems, powder coating compositions, printing inks and other coating materials.

The pigmenting of the high molecular weight organic materials with the novel compounds of formula I is conveniently effected by directly incorporating a compound of formula I by itself or in the form of a masterbatch. Standard incorporation techniques are employed, for example, incorporating the novel colorants into the substrates using roll mills, mixing or milling apparatus. The pigmented material is then brought into the desired final form by methods which are known per se, e.g., by calendering, molding, extruding, coating, casting, melt mixing, blending, dissolution, injection molding etc.

For pigmenting paint systems, coating materials and printing inks, the novel compounds of formula I, together with optional additives such as fillers, other pigments, siccatives or plasticizers, are finely dispersed or dissolved in suitable carrier such as an organic solvent, water or powder. The procedure may be such that the individual components by themselves, or also several components together, are dispersed or dissolved in the carrier and thereafter all the components are mixed.

Other applications for the compounds of the present invention will be apparent to those skilled in the art and the invention is not limited to the applications disclosed herein.

EXAMPLES

The following Examples serve to illustrate the invention without intending to be restrictive in nature; parts and percentages are by weight, unless otherwise stated.

$^1$H, (300.08) spectra are obtained on a VARIAN MODEL GEMINI-300, Chemical shifts are reported in ppm ($\delta$). MS spectra are obtained on a PERSPECTIVE BIOSYSTEM VOYAGER DE-STR matrix assisted laser desorption ionization mass spectrometer (MALDI-TOF) equipped with a 337 nm N2 laser and a time of flight analyzer, operated in negative mode. The samples are deposited directly on the plate without any matrix. Fluorescence emission spectra are recorded with a FLUOROLOG-3 spectrofluorimeter, in a right angle set up. CIE L*A*B* color measurements are taken using a BYK GARDNER TCS Spectrophotometer, Model 8870. The difference in color is reported as $\Delta E$, the larger the value the larger the color change.

Pigment dispersions in acrylic resin are prepared by processing a mixture of 0.25 g pigment, 25 g acrylic resin (ROHM & HAAS PARALOID B-66), 6 g xylene and 35 g glass bead grinding media in a 4 oz. glass jar using a SKANDEX Disperser for 120 minutes.

Quartz discs are spin coated with the 0.5 grams pigment dispersions using a HEADWAY RESEARCH PHOTO-RESIST SPINNER, Model #EC1-1DT-R790, the discs are spun at 1800 rpm for 6 seconds and force-dried for 5 minutes at 60° C.

Example 1

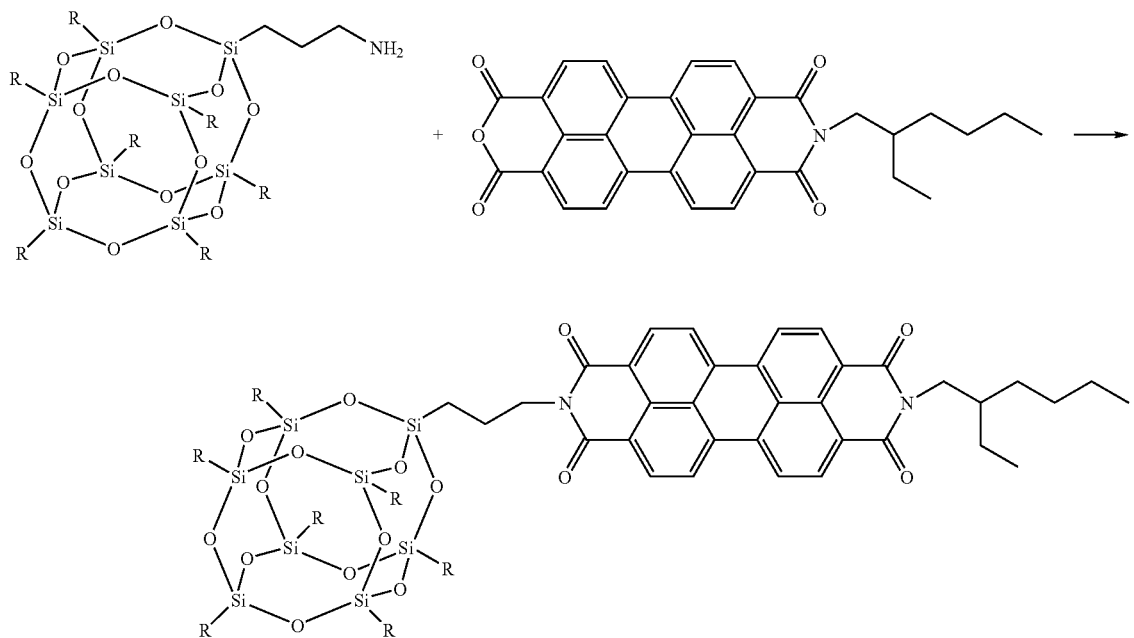

R = CH2—CH(CH3)2

A mixture of amino propyl Isobutyl POSS (0.88 g, 1 mmol), N-(2'-ethylhexyl)-3,4,9,10-perylenetetracarboxylic monoimide monoanhydride (0.5 g, 1 mmol) and imidazole (40 g) is heated to 140° C. and stirred under nitrogen for 4 hours. The reaction mixture is cooled to 75° C. and 150 ml of ethanol is added. The solution is poured onto 500 ml of ice/water, decanted, then centrifuged at 4000 rpm for 5 minutes. The residue is washed with ethanol and the product dried overnight at 75° C. under reduced pressure to provide 0.88 grams of the product as a red solid. $^1$H NMR (CDCl$_3$) (300 MHz): δ (ppm)=8.65 (d, 2H); 8.64 (d, 2H); 8.56 (d, 2H); 8.55 (d, 2H); 4.21 (t, 2H); 4.15 (t, 2H); 1.9-1.8 (m, 10H); 1.3-1.4 (m 8H); 09 (m, 48H); 0.7-0.6 (m, 16H);

The thus obtained product exhibits strong solid state fluorescence with maxima between 620 and 680 nm whereas the starting N-(2'-ethylhexyl)-3,4,9,10-perylenetetracarboxylic monoimide monoanhydride exhibits very weak solid state fluorescence centered around ~670 nm.

Example 2

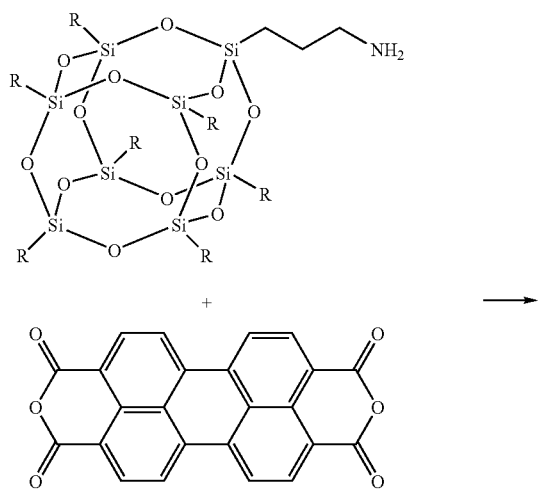

-continued

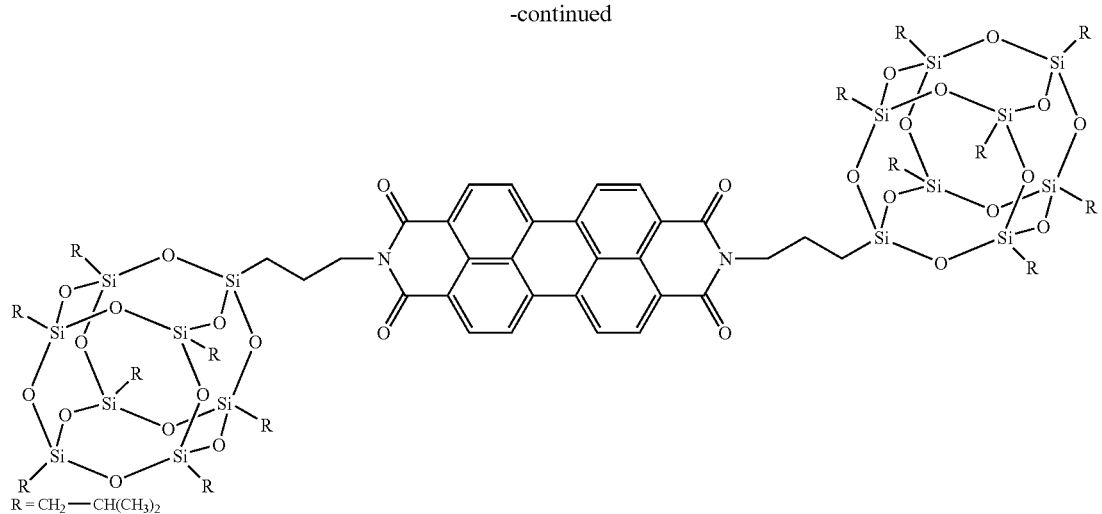

R = CH₂—CH(CH₃)₂

The procedure of example 1, is repeated except amino propyl Isobutyl POSS (9.61 g, 11 mmol), 3,4,9,10-perylene tetracarboxylic dianhydride (1.96 g, 5 mmol) and imidazole (90 g) are used to provide 7.6 grams of the product as a red solid. $^1$H NMR (CDCl$_3$) (300 MHz): δ (ppm)=8.65 (d, 4H); 8.63 (d, 4H); 4.15 (t, 4H); 1.8 (m, 18H); 0.95 (d, 84H); 0.7 (t, 32H);

The thus obtained product exhibits strong solid state fluorescence with maxima between 620 and 680 nm whereas the starting 3,4,9,10-perylene tetracarboxylic dianhydride exhibits extremely weak solid state fluorescence centered around ~670 nm.

Example 3

The procedure of example 2, is repeated except that amino propyl Isobutyl POSS (9.61 g, 11 mmol), 3,4,9,10-perylene tetracarboxylic dianhydride (1.96 g, 5 mmol) and N-methyl pyrrolidone (05 mL) are used to provide 9 grams of product as a red solid. $^1$H NMR (CDCl$_3$) (300 MHz): δ (ppm)=8.65 (d, 4H); 8.63 (d, 4H); 4.15 (t, 4H); 1.8 (m, 18H); 0.95 (d, 84H); 0.7 (t, 32H);

The thus obtained product exhibits strong solid state fluorescence with maxima between 580 and 660 nm whereas the starting 3,4,9,10-perylene tetracarboxylic dianhydride exhibits extremely weak solid state fluorescence centered around ~670 nm.

Example 4

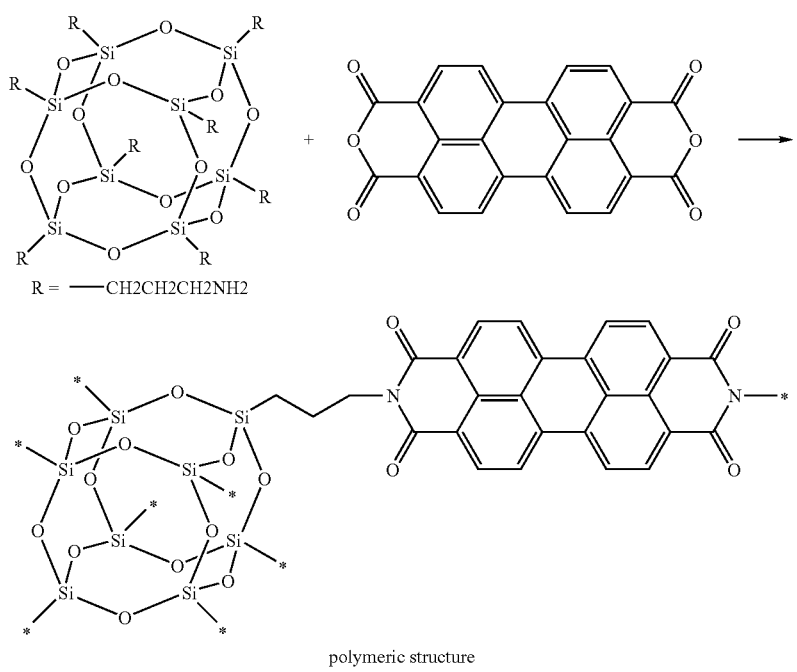

R = —CH2CH2CH2NH2 polymeric structure 4.7 g (4 mmol) of Octa (aminopropyl) POSS, 12.6 g (32 mmol) of perylene tetracarboxylic dianhydride and 75 ml of NMP are treated according to the procedure of Example 1 to yield 15.57 grams of the polymer as a red solid.

The thus obtained product exhibits strong solid state fluorescence with maxima between 630 and 680 nm.

Example 5

The procedure of example 4 is repeated using 4.7 g (4 mmol) of Octa (aminopropyl) POSS and 6.3 g (16 mmol) of perylenete tracarboxylic dianhydride to yield 9.41 grams of the polymer as a red solid.

The thus obtained product exhibits strong solid state fluorescence with maxima between 630 and 680 nm.

Example 6

The procedure of example 4 is repeated using, 4.1 g (3.5 mmol) of Octa (aminopropyl) POSS and 2.7 g (7 mmol) of perylene tetracarboxylic dianhydride to yield 5.9 g of a product which exhibits strong solid state fluorescence.

Example 7

A mixture of aminoethyl aminopropyl POSS (10.09 g, 11.1 mmol), 3,4,9,10-perylene tetracarboxylic dianhydride (1.98 g, 5.0 mmol), and N-methyl pyrrolididone (100 ml) is heated to 140° C. and stirred under nitrogen for 5 hours. The reaction mixture is cooled, N-methyl pyrrolididone is removed via under reduced pressure, 250 ml of ethanol is added. The resulting mixture is stirred for 30 minutes and subjected to centrifuge at 4000 rpm for 5 minutes and the solid residue is dried at 75° C. for 4 hours yielding the product as a red powder (8.90 g).

The product exhibited solid state fluorescence with maxima between 620 and 680 nm whereas the starting 3,4,9,10-perylene tetracarboxylic dianhydride exhibits extremely weak solid state fluorescence centered around 670 nm.

Example 8

The procedure of example 7, is repeated except aminoethyl aminopropyl POSS (11.08 g, 12.07 mmol), 3,4,9,10-perylene tetracarboxylic dianhydride (2.04 g, 5.20 mmol) and imidazole (90 g) are used, 150 ml ethanol added are added after cooling and the product is isolated via filtration to yield, after drying at 75° C., a red powder (8.57 g). The product exhibited extremely weak solid state fluorescence with maxima 650 and 680 nm.

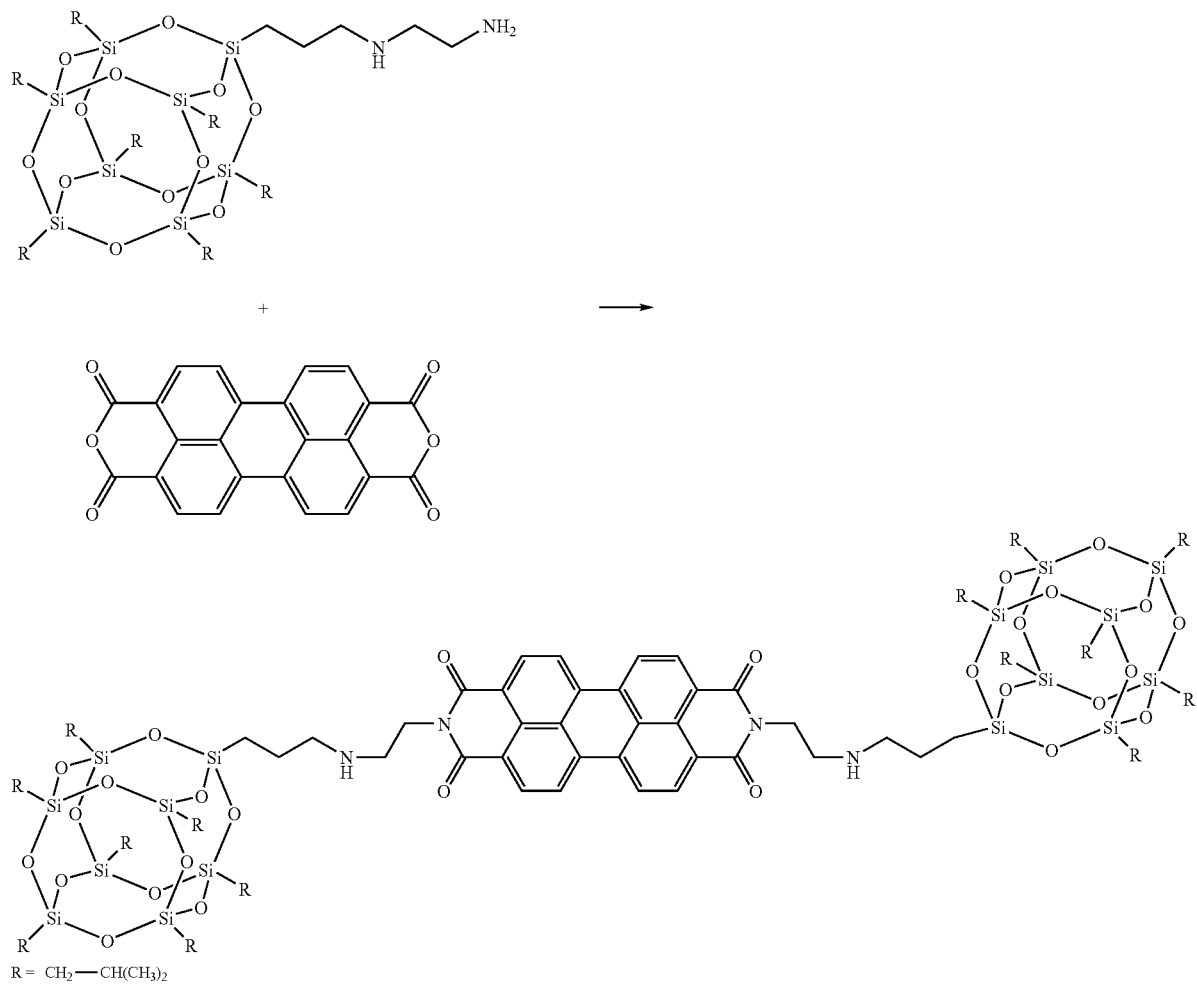

Example 9

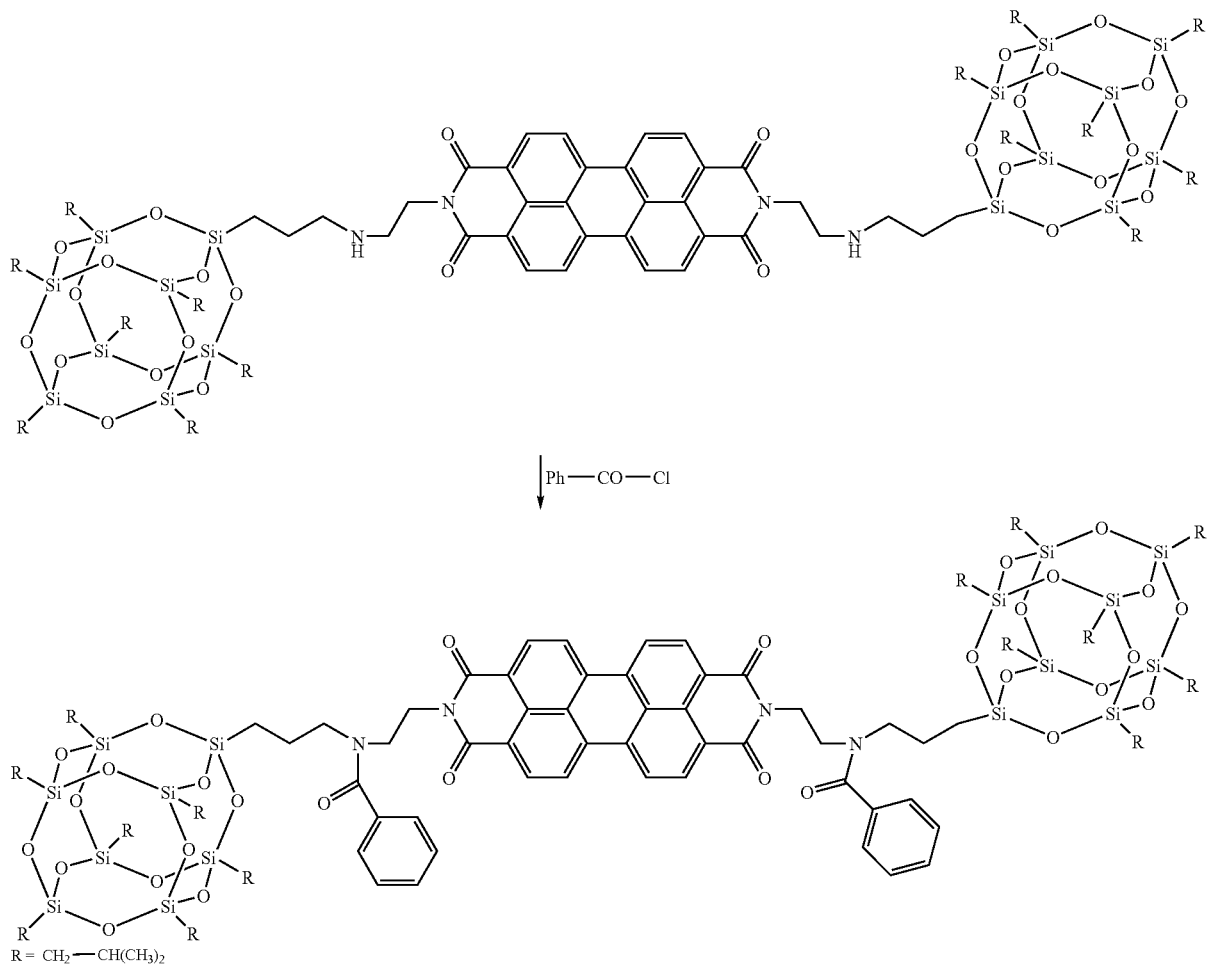

A mixture of the product from example 7 (3.71 g, 1.68 mmol), dimethylaminopyridine (0.93 g, 7.61 mmol), benzoyl chloride (0.53 g, 3.77 mmol) and 20 ml of methylene chloride is stirred overnight at room temperature. The mixture is then washed twice with 30 ml of water, dried over magnesium chloride, and evaporated to yield 2.41 g of the product.

The thus obtained product exhibits strong solid state fluorescence with maxima at 674 nm whereas the starting material exhibits weaker solid state fluorescence between 620 and 680 nm.

Example 10

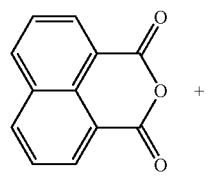

-continued

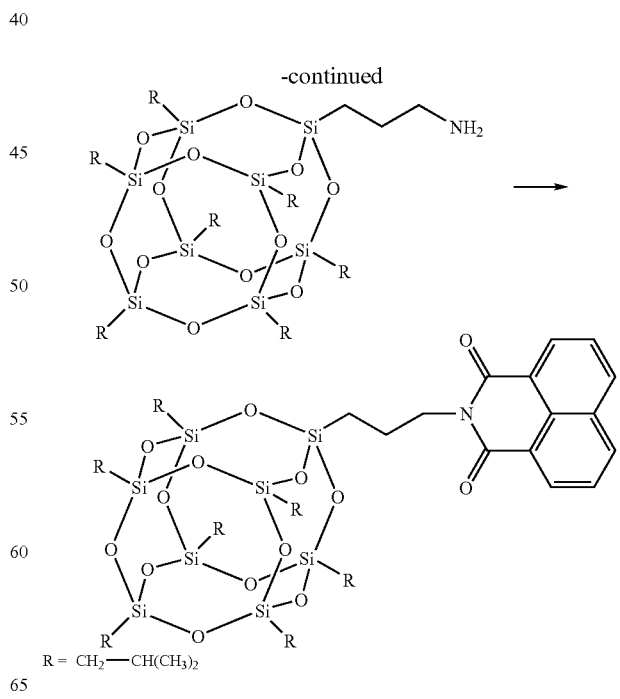

A mixture of naphthalic anhydride (2.03 g, 10.24 mmol), amino propyl isobutyl POSS (8.75 g, 10.00 mmol) and 100 ml N-methyl pyrrolididone is stirred at 140° C. for 4 hours then cooled and the solvent is removed under reduced pressure. The residue is washed with 25 ml of a 0.5% NaOH solution in water, filtered, the collected solid is rinsed with ethanol and air dried to yield 9.83 g of the product which exhibits weak fluorescence in an acrylic resin dispersion.

Example 11

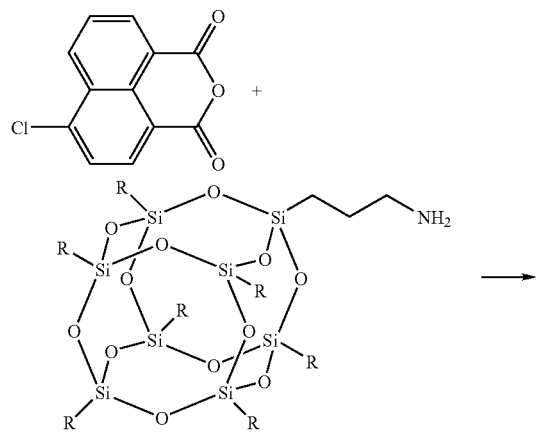

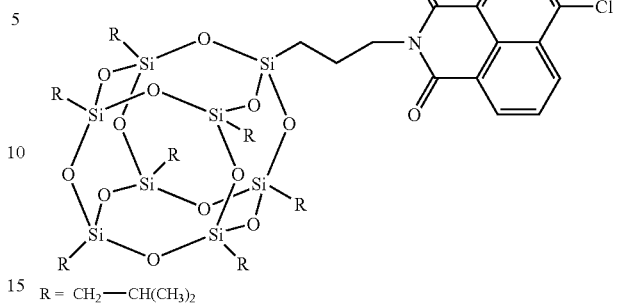

R = $CH_2-CH(CH_3)_2$

The procedure for example 10, is repeated except 4-chloro-naphthalic anhydride (2.33 g, 10.01 mmol), amino propyl isobutyl POSS (8.77 g, 10.02 mmol) and 100 ml N-methyl pyrrolididone are used to yield 10.30 g of the product as a solid which exhibits fluorescence in an acrylic resin dispersion.

Example 12

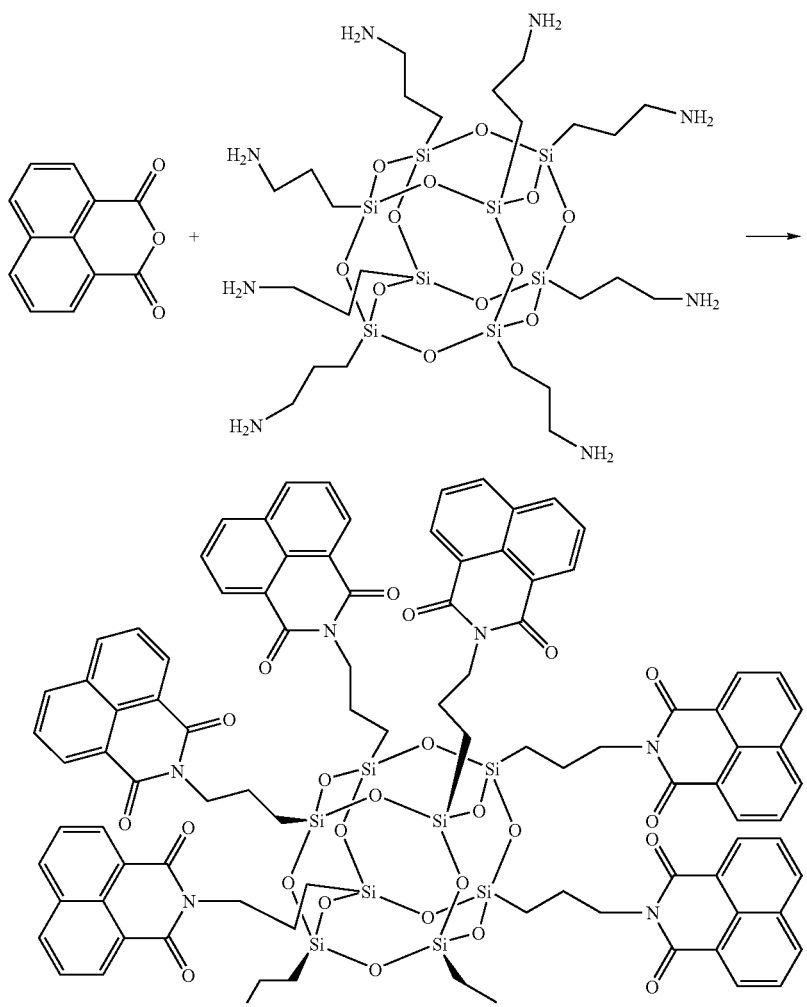

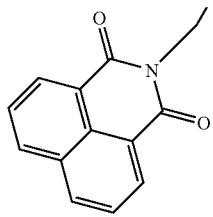 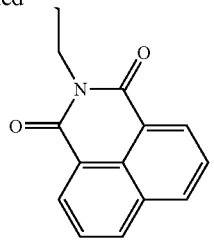
The procedure for example 10, is repeated except naphthalic anhydride (6.37 g, 32.14 mmol), octa-ammonium POSS (4.72 g, 4.02 mmol) and 75 ml N-methyl pyrrolididone, and 25 g imidazole are used to yield 8.07 g of a solid product which exhibits no appreciable fluorescence in an acrylic resin dispersion.
Example 13
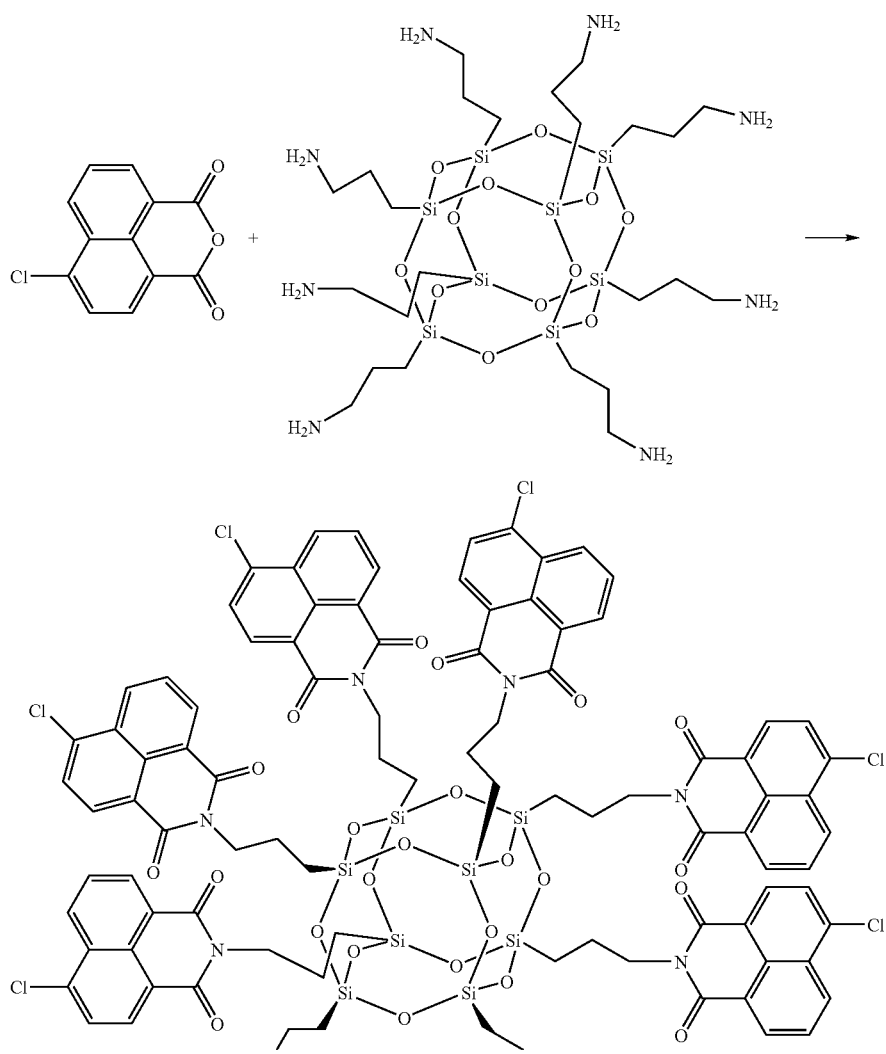

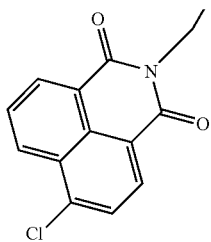
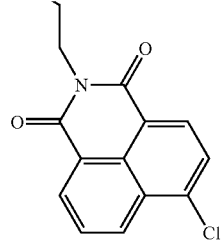

The procedure for Example 10 is repeated except 4-chloronaphthalic anhydride (7.50 g, 32.24 mmol), octa-ammonium POSS (4.70 g, 4.00 mmol) 75 ml N-methyl pyrrolididone and 25 g imidazole are used to yield 4.10 g of a solid product which exhibits fluorescence in an acrylic resin dispersion.

Example 14

A mixture of amino propyl Isobutyl POSS (8.75 g, 10 mmol), 1,6,7,12-tetrachloro-3,4,9,10-perylene tetracarboxylic dianhydride (2.29 g, 4.15 mmol) and propionic acid (150 g) is heated to 140° C. and stirred under nitrogen for 16 h. The reaction mixture is cooled to 30° C. and the solid product is collected by filtration, washed with methanol and dried overnight at 75° C. under reduced pressure to provide 7.3 grams of

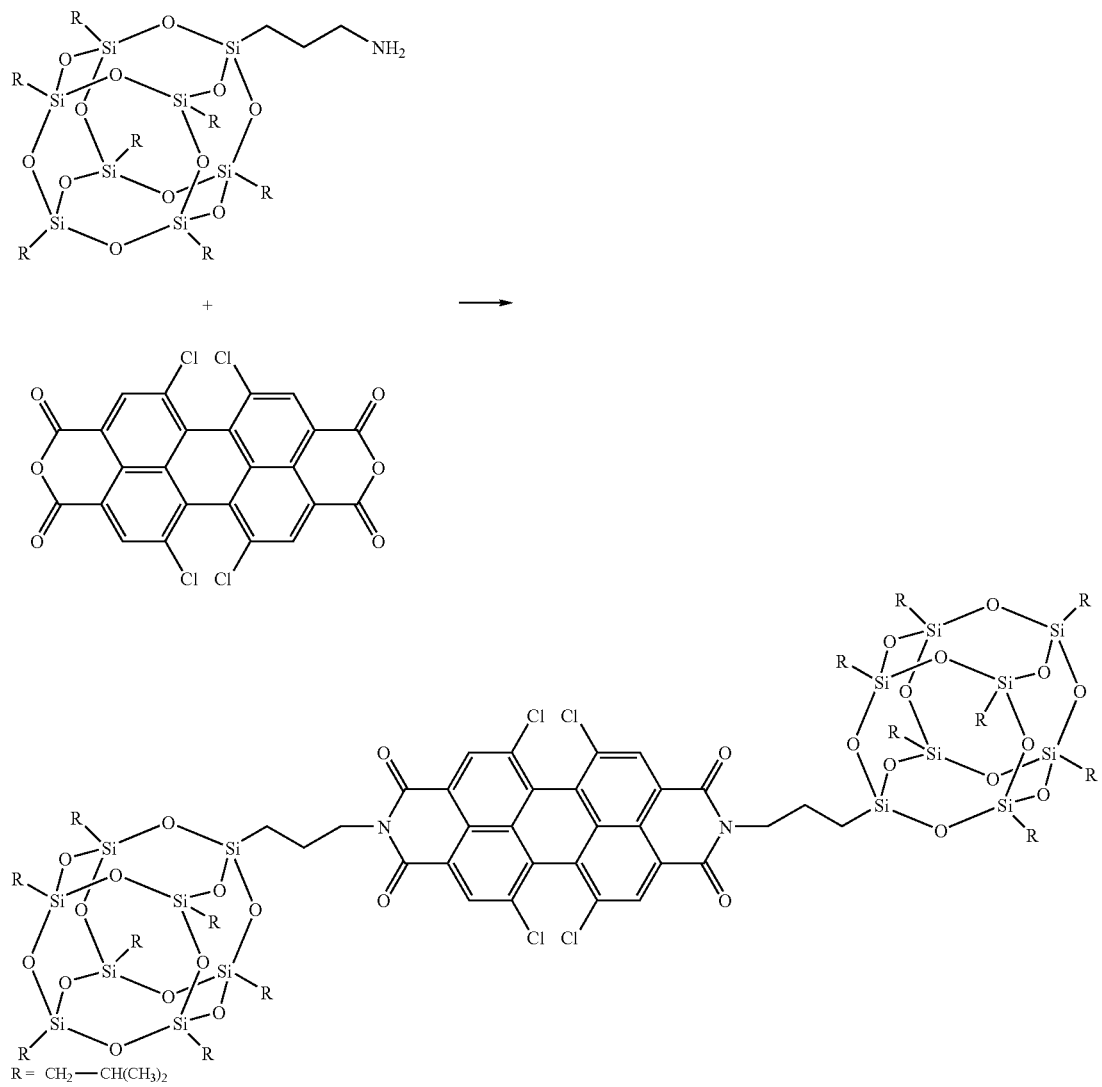

the product as a violet solid. ¹H NMR (CDCl₃) (300 MHz): δ (ppm)=8.46 (s, 4H); 4.12 (t, 4H); 1.8 (m, 18H); 0.95 (d, 84H); 0.67 (t, 32H).
UV/VIS (CHCl₃): λmax=517 nm
Example 15
A mixture of n-butylamine (9.8 g, 134 mmol), 1,6,7,12-tetrachloro-3,4,9,10-perylene tetracarboxylic dianhydride (17.7 g, 33.4 mmol) and propionic acid (200 g) is heated to 140° C. and stirred under nitrogen for 8 hours. The reaction mixture is cooled to 30° C. and the solid product is collected
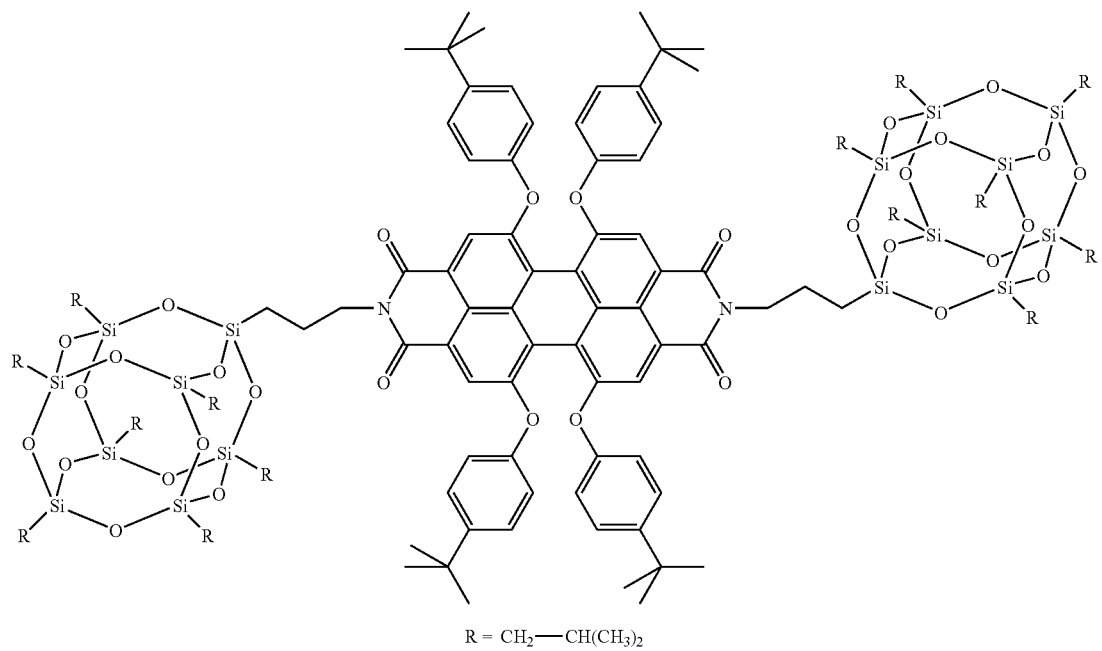
R = CH₂—CH(CH₃)₂
Step a
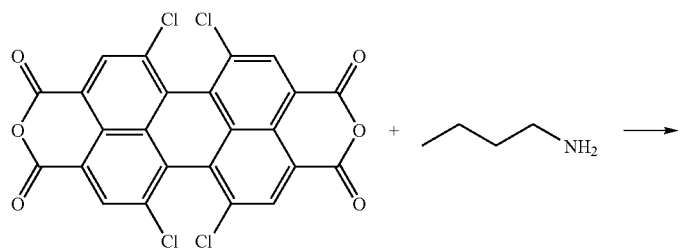
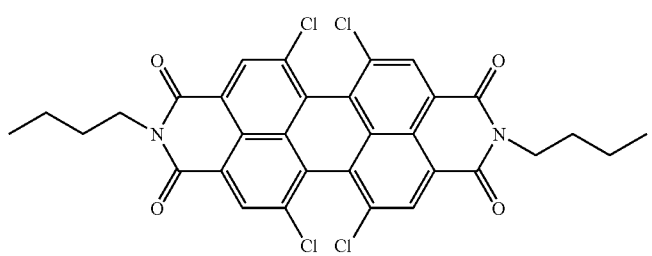

by filtration, washed with saturated sodium hydrogen carbonate solution followed by water and dried overnight at 100° C. under reduced pressure to provide 19.6 grams of the product as a violet solid. $^1$H NMR (CDCl$_3$) (300 MHz): δ (ppm)=8.66 (s, 4H); 4.18 (t, 4H); 1.8 (m, 4H); 1.48 (m, 4H); 1.00 (t, 6H).

UV/VIS (CHCl$_3$): λmax=519 nm

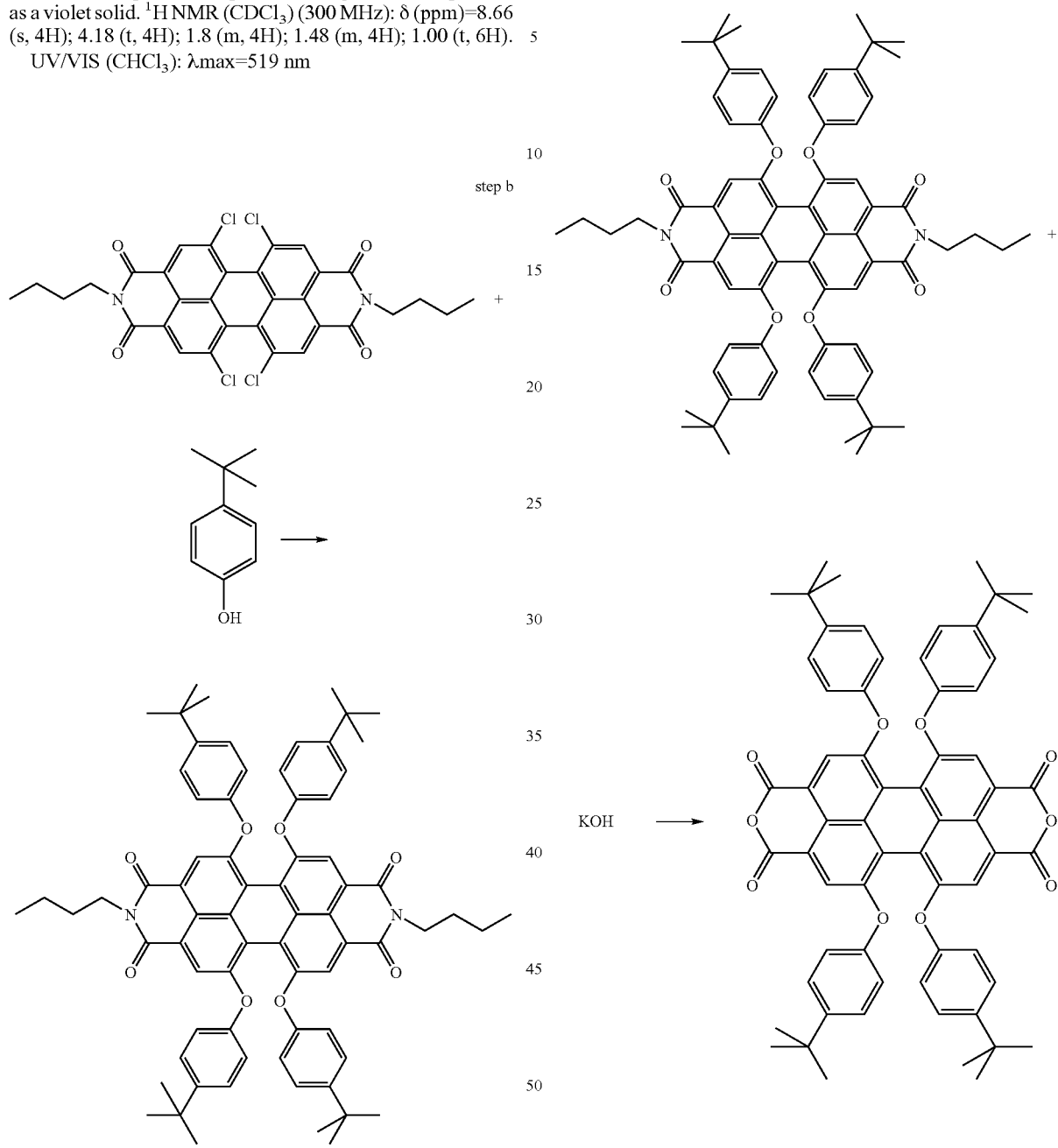

A mixture of 1,6,7,12-tetrachloro-N,N'-di(n-butyl)-3,4,9,10-perylene tetracarboxylic diimide (9.6 g, 15.0 mmol) from step a, 4-tert-butylphenol (9.9 g, 66.0 mmol), potassium carbonate (6.3 g, 45.0 mmol) and N-methyl-2-pyrrolidine (150 g) is heated to 140° C. and stirred under nitrogen for 8 hours. The reaction mixture is cooled to 30° C. and the solid product is collected by filtration, washed with water followed by methanol and dried overnight at 100° C. under reduced pressure to provide 13.3 grams of the product as a violet solid. $^1$H NMR (CDCl$_3$) (300 MHz): δ (ppm) 8.23 (s, 4H); 7.23 (d, 8H); 6.8 (d, 8H); 4.12 (t, 4H); 1.68 (m, 4H); 1.40 (m, 4H); 1.23 (s, 36H); 0.90 (t, 6H).

UV/VIS (CHCl$_3$): λmax=584 nm

A mixture of 1,6,7,12-tetra(4'-t-butylphenoxy)-N,N'-di(n-butyl)-3,4,9,10-Perylene tetracarboxylic diimide (7.0 g, 6.4 mmol) from step b, potassium hydroxide (85%) (12.0 g, 182.0 mmol) and isopropyl alcohol (200 g) is heated to 80° C. and stirred under nitrogen for 16 hours. The reaction mixture is cooled to 40° C. and glacial acetic acid (200 gm) followed by dilute hydrochloric acid (6%, 400 ml) is added. The solid product is collected by filtration, washed with water and dried overnight at 100° C. under reduced pressure to provide 5.5 grams of the product as a violet solid. $^1$H NMR (CDCl$_3$) (300 MHz): δ (ppm) 8.21 (s, 4H); 7.24 (d, 8H); 6.8 (d, 8H); 1.28 (s, 36H).

UV/VIS (CHCl$_3$): λmax=580 nm

31
Step d
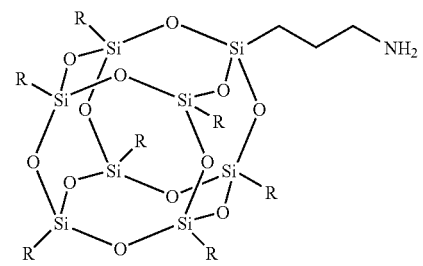
+
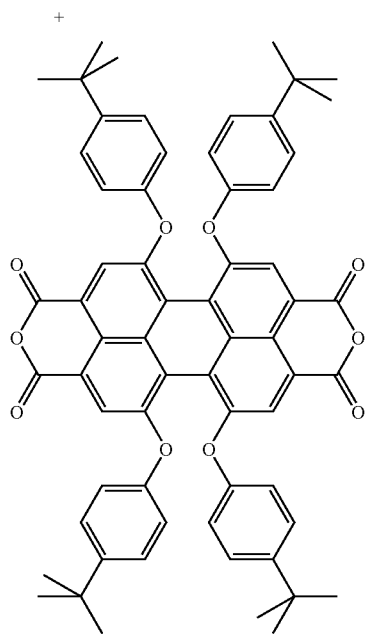
→
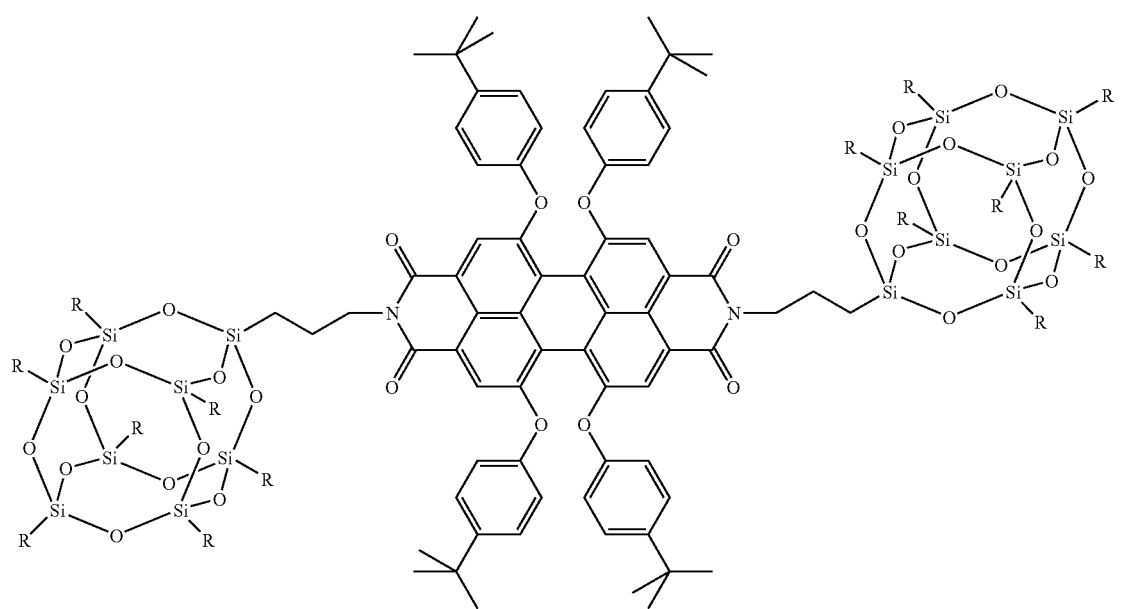
R = CH₂—CH(CH₃)₂

A mixture of amino propyl Isobutyl POSS (4.5 g, 5 mmol) and 1,6,7,12-tetra(4'-t-butylphenoxy)-3,4,9,10-perylene tetracarboxylic dianhydride (1.7 g, 2 mmol) from step c in N-methyl-2-pyrrolidine (70 g) is heated to 130° C. and stirred under nitrogen for 6 hours.

The reaction mixture is cooled to 30° C. and the solid product is collected by filtration, washed with methanol and dried overnight at 75° C. under reduced pressure to provide 3.9 grams of the product as a red violet solid. $^1$H NMR (CDCl$_3$) (300 MHz): δ (ppm)=8.21 (s, 4H); 7.21 (d, 8H); 6.82 (d, 8H); 4.1 (t, 4H); 1.8 (m, 18H); 1.25 (s, 36H); 0.95 (d, 84H); 0.67 (t, 32H).

UV/VIS (CHCl$_3$): λmax=578 nm

Example 16

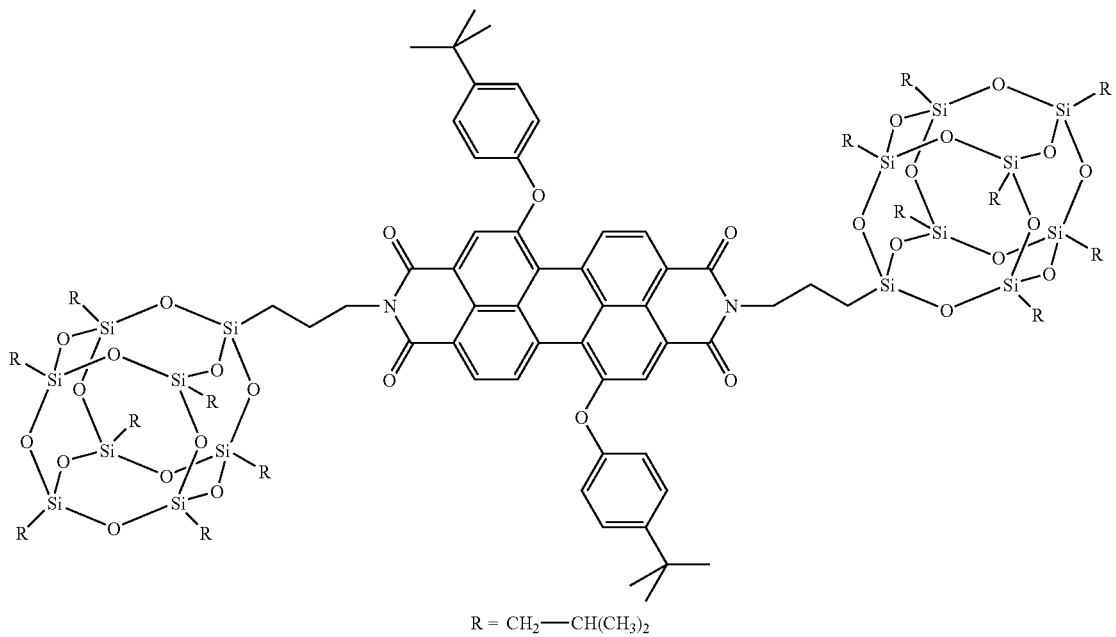

R = CH$_2$—CH(CH$_3$)$_2$

Step a

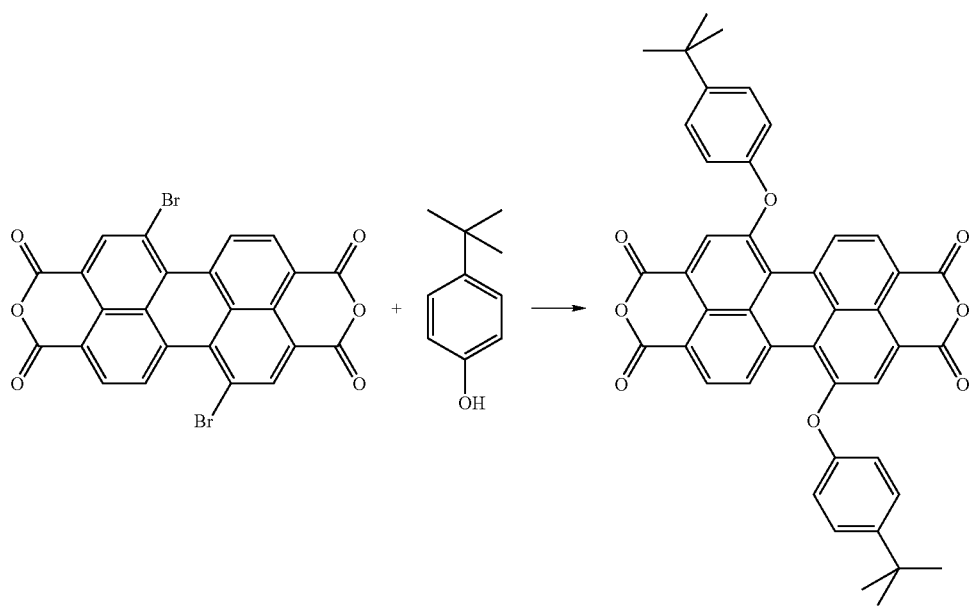

A mixture of 1,7-dibromo-3,4,9,10-Perylene tetracarboxylic dianhydride (5.0 g, 9.1 mmol), 4-tert-butylphenol (7.0 g, 46.6 mmol), potassium carbonate (4.2 g, 30.4 mmol) and N-methyl-2-pyrrolidine (150 g) is heated to 120° C. and stirred under nitrogen for 6 hours. The reaction mixture is cooled to 50° C. The solid product is collected by filtration and washed with hot N-methyl-2-pyrrolidine (150 g). The solid is then suspended in dilute hydrochloric acid (6%, 400 gm) and heated to 75° C. for 2 hours, collected by filtration, washed with water and dried overnight at under reduced pressure to provide 4.8 grams of the product as a red violet solid.

UV/VIS (CHCl$_3$): λmax=544 nm

Step b

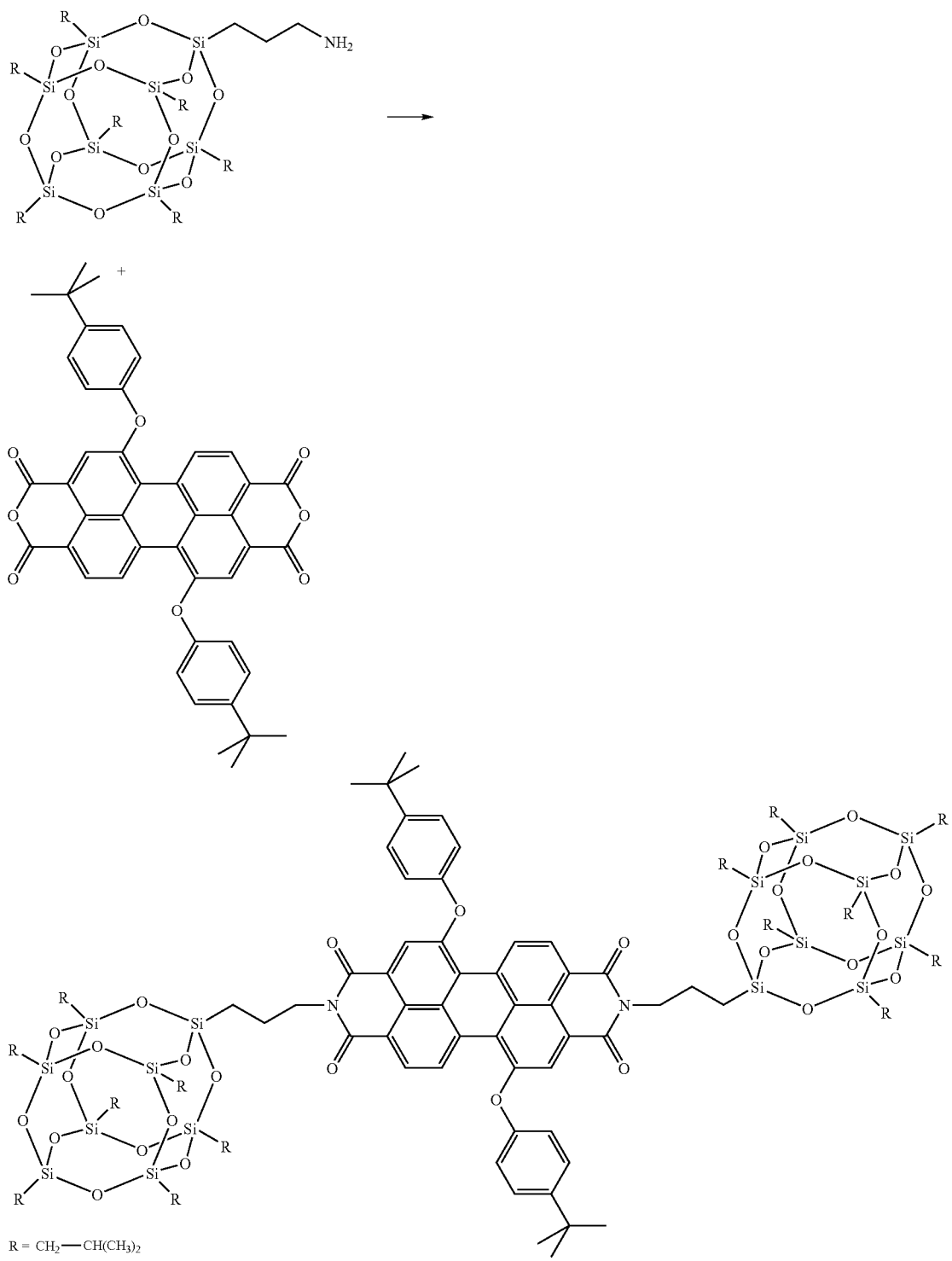

A mixture of amino propyl Isobutyl POSS (4.5 g, 5 mmol), 1,7-di(4'-t-butylphenoxy)-3,4,9,10-Perylene tetracarboxylic dianhydride (1.38 g, 2 mmol) in N-methyl-2-pyrrolidine (50 g) is heated to 120° C. and stirred under nitrogen for 6 hours. The reaction mixture is cooled to 30° C. and the solid product is collected by filtration, washed with methanol and dried overnight at 75° C. under reduced pressure to provide 3.4 grams of the product as a red violet solid. $^1$H NMR (CDCl$_3$) (300 MHz): δ (ppm)=9.65 (d, 2H); 8.6 (d, 2H); 8.35 (s, 2H); 7.45 (d, 4H); 7.09 (d, 4H); 4.13 (t, 4H); 1.78 (m, 18H); 1.35 (s, 18H); 0.92 (d, 84H); 0.65 (t, 32H).

UV/VIS (CHCl$_3$): λmax=545 nm

Example 17

Quartz discs are individually coated with pigment dispersions in acrylic resin prepared as above using as pigments the product from Example 11 (disc A), the product from Example 13 (disc B), the commercial colorant AURORA PINK GT-11 (disc C1) and the commercial colorant CORONA MAGENTA GT-21 (disc C2). All dried samples exhibit fluorescence.

Example 18

The coated quartz discs from Example 17 are exposed in an ATLAS WEATHEROMETER, Model Ci4000 using a single xenon lamp with inner and outer borosilicate glass filters and constant irradiance of 0.55 Watts/m$^2$. The discs are rotated around the lamp for 200 hours and then removed. Discs A and B exhibit fluorescence at about 520 nm, discs C1 and C2 exhibit a stronger fluorescence, relative to discs A and B, at about 540 nm.

Example 19

The product from Example 2, the commercial colorant AURORA PINK GT-11 and the commercial colorant CORONA MAGENTA GT-21 are each incorporated into individual polyvinyl chloride (PVC) films at 0.2 weight %. Each film exhibits fluorescence.

The films are then exposed in an ATLAS WEATHEROMETER as in Example 15 for 200 hours and then removed. The films containing the commercial colorants exhibit a diminished fluorescence at about 550 nm, the film containing the product from Example 2 exhibits a stronger fluorescence, relative to the films containing the commercial colorants, at about 530 and 570 nm.

Example 20

Quartz discs are individually coated with pigment dispersions in acrylic resin prepared as above using as pigments the product from Example 2 (disc D), the product from, the commercial colorant AURORA PINK GT-11 (disc C1) and the commercial colorant CORONA MAGENTA GT-21 (disc C2). Color measurements of the dried samples are recorded. All dried samples exhibit fluorescence.

The discs are exposed in an ATLAS WEATHEROMETER as in Example 15 for 200 hours, after which time they are removed and color and fluorescence are measured.

Disc D exhibits a smaller ΔE (less color change) than either disc C1 or C2.

Discs C1 and C2 exhibit a diminished fluorescence at about 540 nm, disc D exhibits a stronger fluorescence, relative to discs C1 and C2, at about 530 nm.

What is claimed:

1. A fluorescent colorant of formula (I)

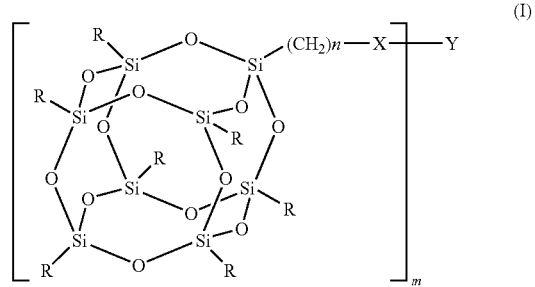

wherein,
m is 1 or 2;
n is 1-18;
X is a direct bond, —O—, —S—, —NH—, —CO—, or —COO—;
each R is independently selected from the group consisting of $C_1$-$C_{25}$ alkyl, $C_2$-$C_{25}$ alkyl interrupted one or more times by one or more groups selected from —O— and —S—, $C_2$-$C_{24}$ alkenyl, $C_3$-$C_{24}$ alkenyl interrupted one or more times by one or more groups selected from —O— and —S—, $C_7$-$C_9$ phenylalkyl, a group —(CH$_2$)n-X—(Y)z wherein n is defined as above and z is 1 or ½ and when more than one z is present each z is independently selected, phenyl and phenyl substituted 1 to 5 times by one or more groups selected from $C_1$-$C_8$alkyl, $C_1$-$C_8$alkyloxy and halogen;
Y is a radical of a chromophore selected from the group consisting of napthalimides, diketopyrrolopyrroles, perylenes, quinacridones, benzoxanthenes, xanthenes, diphenylmaleimides, acetoacetamides, perylenemonoimides, and phthalimides, wherein when more than one Y is present, each Y is selected independently of the others.

2. A fluorescent colorant according to claim 1, wherein n is 1, 2, 3, or 4 and each R is independently selected from the group consisting of $C_1$-$C_{25}$ alkyl, $C_2$-$C_{24}$ alkenyl, $C_7$-$C_9$ phenylalkyl, phenyl and phenyl substituted 1 to 5 times by one or more groups selected from $C_1$-$C_8$alkyl, $C_1$-$C_8$alkyloxy and halogen.

3. A fluorescent colorant according to claim 1,
wherein
n is 1, 2, 3 or 4,
X is a direct bond, —NH—, or —CO—,
each R is independently selected from the group consisting of $C_1$-$C_6$ alkyl, and a group —(CH$_2$)n-X—(Y)z and
Y is selected from the group consisting of xanthene, perylene, benzoxanthene, naphthalimide, quinacridone and diketopyrrolopyrrole chromophores.

4. A fluorescent colorant according to claim 3, wherein n is 3 and each R is independently selected from the group consisting of t-butyl, cyclohexyl, and a group —(CH$_2$)n-X—(Y) z.

5. A fluorescent colorant according to claim 1, wherein Y is selected from the group consisting of perylene, benzoxanthene, naphthalimide and diketopyrrolopyrrole chromophores.

6. A fluorescent colorant according to claim 2, wherein Y is selected from the group consisting of perylene, benzoxanthene, naphthalimide and diketopyrrolopyrrole chromophores.

7. A fluorescent colorant according to claim 1, wherein any number of R groups from 1 through 7 are a group —(CH$_2$)n-X—(Y)z.

8. A fluorescent colorant according to claim 7, wherein z is 1.

9. A fluorescent colorant according to claim 7, wherein at least one z is ½.

10. A fluorescent colorant according to claim 9, wherein m is 2.

11. A fluorescent colorant according to claim 1, wherein one of the R groups is a group —(CH$_2$)n-X—(Y)z.

12. A composition comprising
(a) an organic material, and
(b) a fluorescent colorant according to claim 1.

13. A composition according to claim 12, wherein the composition is a coating composition and component (a) is an organic film-forming binder.

14. A composition according to claim 12, wherein component (a) is a thermoplastic, thermoset, elastomeric or a crosslinked thermoplastic, thermoset, elastomeric polymer.

15. An ink composition comprising a fluorescent colorant according to claim 1.

\* \* \* \* \*